(12) United States Patent
Lu et al.

(10) Patent No.: US 12,461,663 B2
(45) Date of Patent: Nov. 4, 2025

(54) ENCRYPTED USB FLASH DISK SYSTEM AND IMPLEMENTATION METHOD THEREFOR

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 246 days.

(21) Appl. No.: 17/626,304

(22) PCT Filed: Oct. 22, 2020

(86) PCT No.: PCT/CN2020/122810
§ 371 (c)(1),
(2) Date: Jan. 11, 2022

(87) PCT Pub. No.: WO2021/129094
PCT Pub. Date: Jul. 1, 2021

(65) Prior Publication Data
US 2022/0317895 A1 Oct. 6, 2022

(30) Foreign Application Priority Data
Dec. 24, 2019 (CN) .......................... 201911349719.5

(51) Int. Cl.
G06F 3/06 (2006.01)
G06F 21/60 (2013.01)
G06F 21/79 (2013.01)

(52) U.S. Cl.
CPC .......... *G06F 3/0622* (2013.01); *G06F 3/0637* (2013.01); *G06F 3/0655* (2013.01);
(Continued)

(58) Field of Classification Search
CPC ... G06F 3/0622; G06F 3/0655; G06F 3/00679
See application file for complete search history.

(56) References Cited

U.S. PATENT DOCUMENTS 7,178,025 B2 * 2/2007 Scheidt ................. H04L 63/062
713/168
8,335,931 B2 * 12/2012 Lee ........................ G06F 21/575
713/192
(Continued)

FOREIGN PATENT DOCUMENTS

EP          1840732 A1 * 10/2007 ............. G06F 7/723
WO   WO-2007032535 A1 *  3/2007 ............. G06F 21/10

*Primary Examiner* — Philip J Chea
(74) *Attorney, Agent, or Firm* — J. Clinton Wimbish; Maynard Nexsen PC

(57) ABSTRACT

An implementation method for an encrypted USB flash disk system. A virtual drive letter is bound to an device object and then mapped; driver software wafts for an operation of an operating system on the device object; the driver software determines, according to the operation of the operating system on different device objects, the type of a received instruction; if the received instruction is a reading instruction, the driver software maps a read address in a storage chip according to a first address in the reading instruction, reads data, and calls an encryption lock chip to decrypt the read data to obtain decrypted read data; and if the received instruction is a writing instruction, the driver software calls the encryption lock chip to encrypt data to be written to obtain encrypted write data, maps a write address in the storage chip according to a second address in the writing instruction, and writes the encrypted write data or refuses the operation. The present invention can encrypt and store data and decrypt and read data, thereby ensuring the safety of data reading and writing, and can also use the encrypted USB flash disk as an optical disk for data reading and writing.

7 Claims, 4 Drawing Sheets

(52) U.S. Cl.
CPC .......... *G06F 3/0679* (2013.01); *G06F 21/602* (2013.01); *G06F 21/79* (2013.01)

(56) References Cited

U.S. PATENT DOCUMENTS

| | | | | |
|---|---|---|---|---|
| 8,402,287 | B2* | 3/2013 | Vigilant | H04L 9/003 380/28 |
| 8,850,221 | B2* | 9/2014 | Salgado | G06F 11/1004 713/189 |
| 9,424,430 | B2* | 8/2016 | Rosenan | G06F 21/71 |
| 9,852,218 | B1* | 12/2017 | Epstein | H04N 21/41407 |
| 10,055,568 | B1* | 8/2018 | Biesecker | G06F 21/575 |
| 10,824,771 | B2* | 11/2020 | Achillopoulos | G06F 11/3006 |
| 10,938,559 | B2* | 3/2021 | Hunt | H04L 9/0897 |
| 10,956,157 | B1* | 3/2021 | Kaplan | G06F 9/3838 |
| 10,990,671 | B2* | 4/2021 | Tutika | G06F 16/17 |
| 11,089,478 | B2* | 8/2021 | Moshir | H04L 63/0428 |
| 11,233,630 | B2* | 1/2022 | Bolotin | H04W 12/03 |
| 11,366,933 | B2* | 6/2022 | Mastenbrook | G06F 21/602 |
| 11,669,648 | B2* | 6/2023 | Achillopoulos | G06F 21/72 713/193 |
| 12,014,333 | B2* | 6/2024 | Weindling | G06F 3/0488 |
| 2005/0015540 | A1* | 1/2005 | Tsai | G06F 21/78 711/115 |
| 2009/0041244 | A1* | 2/2009 | Lee | G06F 21/10 380/259 |
| 2009/0187759 | A1* | 7/2009 | Marsico | H04L 63/0846 713/181 |
| 2013/0060704 | A1* | 3/2013 | Read | G06F 21/10 705/55 |
| 2016/0315341 | A1* | 10/2016 | Parakulam | H01M 8/04298 |
| 2019/0280860 | A1* | 9/2019 | Peddada | H04L 9/14 |
| 2020/0192825 | A1* | 6/2020 | Ng | G06F 12/1009 |
| 2020/0287880 | A1* | 9/2020 | Getsin | H04L 9/0894 |
| 2024/0007275 | A1* | 1/2024 | Christensen | H04L 9/3297 |

* cited by examiner

ENCRYPTED USB FLASH DISK SYSTEM AND IMPLEMENTATION METHOD THEREFOR

FIELD OF THE INVENTION

The present invention relates to a crypto USB flash disk system, more particularly to a method for realizing the crypto USB flash disk system, which belongs to information security field.

PRIOR ART

With development of science, USB flash disk with common storage function can portably move data. A common USB flash disk in prior art usually has a common USB flash disk memory area and a hidden area. In a process for implementing moving data, common data is copied in the common USB flash disk memory area, the common data in the common USB flash memory area is copied to a device which processes the data. Important data can be stored in the hidden area and is hidden. Since the important data will not be processed, the important data is easy to be stolen in a process for copying the important data by using a common USB flash disk, which is not safe.

In addition, some applications will be issued by using a compact disk as carrier. However, with simplifying of personal computer configuration, a personal computer usually is not configured with a CD-ROM disk drive. A computer without a CD-ROM disk drive cannot read a compact disk. Therefore, setup program or data which is packed in ISO image type is short of channels when it is issued.

SUMMARY OF THE INVENTION

One object of the present invention is to provide a crypto USB flash disk system and a method for implementing the same, which can realize encrypting data to be stored, storing the encrypted data, and decrypting read data in such way that assures security of data to write or read.

Another object of the present invention is to provide a crypto USB flash disk and a method for implementing the same, which can map a hidden area of the crypto USB flash disk as a compact disk, and perform data writing or reading by using the crypto USB flash disk as a compact disk.

Therefore, according to an aspect of the present invention, the present invention provides a method for realizing crypto USB flash disk system, the crypto USB flash disk system including a crypto USB flash disk and a drive software, the method includes a process for using the crypto USB flash disk.

The process for using the crypto USB flash disk includes the following steps:

Step A100) after activating the drive software, building connecting with the crypto USB flash disk;

Step A101) reading, by the driver software, section information of a hidden area, creating a device object of preset device type according to the section information, creating a virtual drive letter according to the device object, mapping the virtual drive letter after binding the virtual drive letter and the device object together;

Step A102) waiting for, by the drive software, operation performed by an operating system on the device object, if the operation performed by an operating system on the device object is operation performed by the operating system on a crypto area device object, executing Step A103, if the operation performed by an operating system on the device object is operation performed by the operating system on a compact disk area device object or read-only area device object, executing Step A106;

Step A103) invoking, by the drive software, a first operating system function, the operating system pops up an interface for verifying crypto area password;

Step A104) obtaining, by the drive software, a crypto area verification password from the interface for verifying crypto area password, determining whether the crypto area verification password is correct, if yes, executing Step A105; if no, ending;

Step A105) determining, by the drive software, type of a received instruction;

if the received instruction is a reading instruction, mapping, by the drive software, a read address in the memory chip according to a first address in the read instruction, reading data, invoking the dongle chip to decrypt the read data to obtain decrypted read data, returning the decrypted read data to the operating system;

if the received instruction is a writing instruction, invoking, by the drive software, the dongle chip to encrypt the data to be written to obtain encrypted data to be written, mapping a write address in the memory chip according to a second address in the write instruction and writing the encrypted data to be written;

A106) determining, by the drive software, the type of the received instruction, if the received instruction is a read instruction, mapping, by the drive software, a read address in the memory chip according to a first address in the read instruction, reading data, invoking the dongle chip to decrypt the read data and returning the decrypted read data to the operating system;

if the received instruction is a write instruction, refusing operating.

According to another aspect of the present invention, the present invention further provides a crypto USB flash disk system, wherein the crypto USB flash disk system includes a crypto USB flash disk and a drive module, the crypto USB flash disk includes a memory chip and a dongle chip; the drive module includes:

an activating unit configured to activate the drive module;
a connecting unit configured to build a connection with the crypto USB flash disk;
a reading unit configured to read section information of hidden area of the memory chip;
a creating and binding unit configured to create a device object of preset device type according to the section information read by the reading unit, create a virtual drive letter according to the device object and bind the virtual drive letter and the device object together;
a mapping unit configured to map the virtual drive letter after the creating and binding unit binds the virtual drive letter and the device object together;
an operating and invoking unit configured to wait for operation performed by an operating system on the device object;
the operating and invoking unit configured to invoke a first operating system function and make the operating system pop up an interface for verifying crypto area password if the operation performed by an operating system on the device object is operation performed by the operating system on a crypto area device object;

an obtaining unit configured to obtain a crypto area verification password from the interface for verifying crypto area password;

a first determining unit configured to determine whether the crypto area verification password obtained by the obtaining unit is correct;

a second determining unit configured to determine type of a receive instruction when the first determining unit determines that the crypto area verification password obtained by the obtaining unit is correct;

a third determining unit configured to determine type of a received instruction if the operation performed by an operating system on the device object is operation performed by the operating system on a compact disk area device object or read-only area device object;

a mapping and reading unit configured to, when the second determining unit determines that the received instruction is read instruction, map a read address in the memory chip according to a first address in the read instruction and read data; further configured to, when the third determining unit determines that the received instruction is read instruction, map a read address in the memory chip according to a first address in the read instruction and read data;

a first invoking unit configured to invoke the dongle chip to decrypt the read data to obtain decrypted read data;

a returning unit configured to return the decrypted read data obtained by the invoking unit to the operating system;

a second invoking unit configured to invoke the dongle chip to encrypt the data to be written to obtain encrypted data to be written;

a mapping and writing unit configured to, when the second determining unit determines that the received instruction is write instruction, map a write address in the memory chip according to a second address in the write instruction, write the encrypted data to be written;

a refusing unit configured to, when the third determining unit determines that the received instruction is write instruction, refuse operating, and the dongle chip configured to decrypt the data read by the mapping and reading unit to obtain the decrypted read data, further configured to encrypt the data to be written by the mapping and writing unit to obtain encrypted data to be written.

According to the present invention, a hidden area is set by dividing the memory chip of the crypto USB flash disk; when using the crypto USB flash disk, after the host computer and the crypto USB flash disk are connected, the crypto USB flash disk maps a compact disk area and a crypto area; the dongle chip of the crypto USB flash disk makes the crypto USB flash disk to realize function of encrypting the data to be stored and decrypting the data to be read, which assures security of the data writing and reading.

In addition, according to the present invention, the hidden area of the crypto USB flash disk is mapped in such a way that the crypto USB flash disk can be used as compact disk for data reading and writing.

BRIEF DESCRIPTION OF THE DRAWINGS

In order to more clearly illustrate the embodiments of the present disclosure or in prior art, the drawings needed in the embodiments or the prior art will be briefly described in the below. It will be obvious that the drawings in the following description are merely some of the embodiments of the present disclosure, and those skilled in the art can obtain other drawings according to these drawings without creative work.

FIG. 2-1 and FIG. 2-2 is a flow chart for another method for realizing crypto USB flash disk system provided by Embodiment 2 of the present invention;

DESCRIPTION OF EMBODIMENTS

The technical solutions of the embodiments of the present disclosure are described clearly and completely in conjunction with the accompanying drawings in the below. Apparently, the described embodiments are merely part but not all of the embodiments of the present disclosure. Based on the described embodiments of the present disclosure, other embodiments obtained by those skilled in the art without any creative work will fall within the scope of protection of the present invention.

Embodiment 1

Embodiment 1 provides a method for realizing crypto USB flash disk system, the crypto USB flash disk system includes a crypto USB flash disk and a drive software; the crypto USB flash disk includes a memory chip and a dongle chip, the method for realizing crypto USB flash disk system includes a process for using the crypto USB flash disk.

Figure 1:
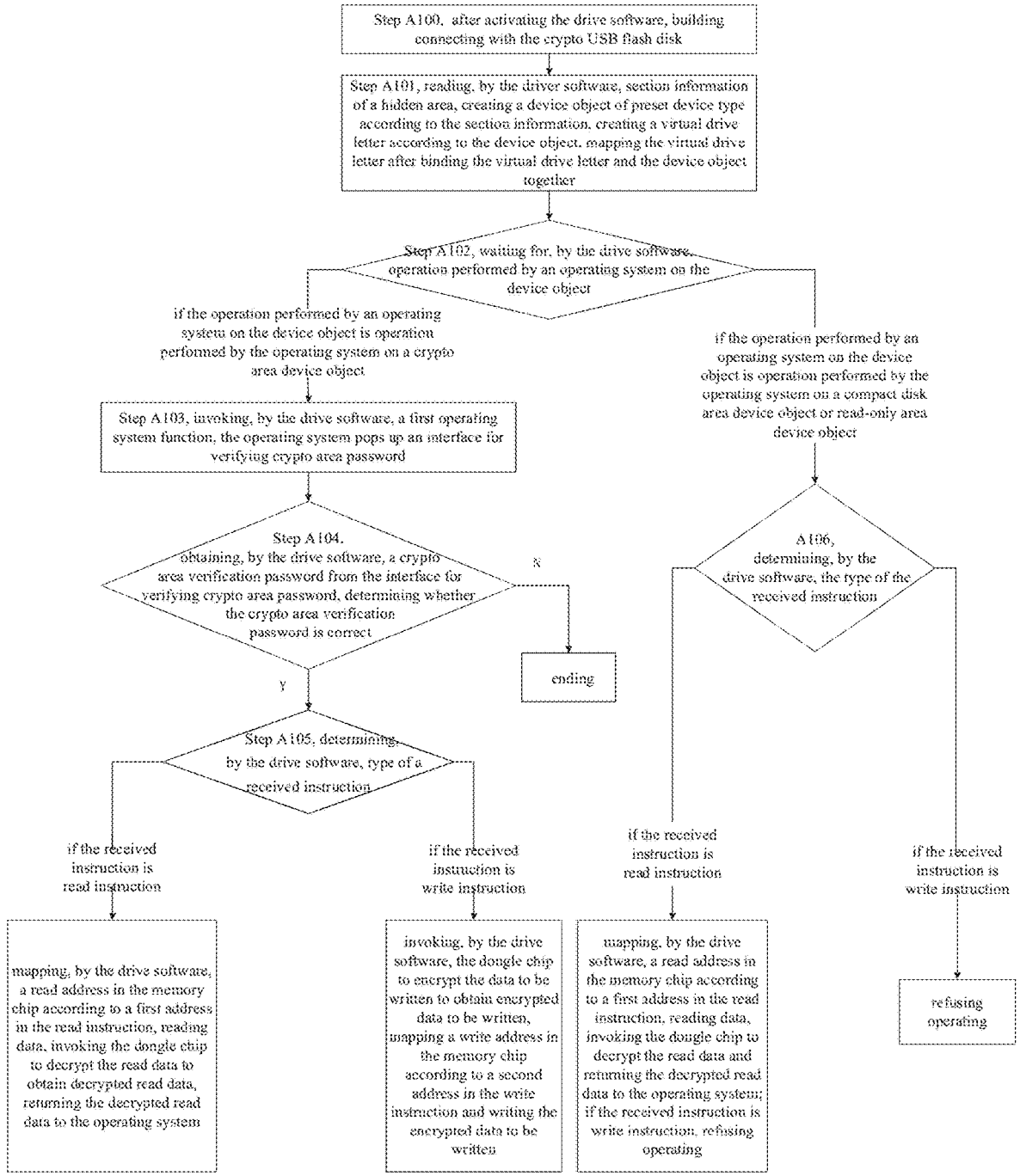
FIG. 1 is a flow chart for a method for realizing crypto USB flash disk system provided by Embodiment 1 of the present invention.

As shown in FIG. 1, the process for using the crypto USB flash disk, includes the following steps:

Step A100, after activating the drive software, building a connecting with the crypto USB flash disk;

Step A101, reading, by the driver software, section information of a hidden area, creating a device object of preset device type according to the section information, creating a virtual drive letter according to the device object, mapping the virtual drive letter after binding the virtual drive letter and the device object together;

Step A102, waiting for, by the drive software, operation performed by an operating system on the device object, if the operation performed by an operating system on the device object is operation performed by the operating system on a crypto area device object, executing Step A103, if the operation performed by an operating system on the device object is operation performed by the operating system on a compact disk area device object or read-only area device object, executing Step A106;

Step A103, invoking, by the drive software, a first operating system function, the operating system pops up an interface for verifying crypto area password;

Step A104, obtaining, by the drive software, a crypto area verification password from the interface for verifying crypto area password, determining whether the crypto area verification password is correct, if yes, executing Step A105; if no, ending;

Step A105, determining, by the drive software, type of a received instruction;

if the received instruction is a reading instruction, mapping, by the drive software, a read address in the memory chip according to a first address in the read instruction, reading data, invoking the dongle chip to decrypt the read data to obtain decrypted read data, returning the decrypted read data to the operating system;

if the received instruction is a writing instruction, invoking, by the drive software, the dongle chip to encrypt the data to be written to obtain encrypted data to be written, mapping a write address in the memory chip according to a second address in the write instruction and writing the encrypted data to be written;

Step A106, determining, by the drive software, the type of the received instruction, if the received instruction is a read instruction, mapping a read address in the memory chip according to a first address in the read instruction, reading data, invoking the dongle chip to decrypt the read data and returning the decrypted read data to the operating system;

if the received instruction is a write instruction, refusing operating.

In Embodiment 1, before Step A101, the method further includes:

determining, by the drive software, whether a hidden area identification exists, if yes, executing Step A101; if no, refusing operating.

In Embodiment 1, before the process for using the crypto USB flash disk, the method further includes a process for initializing the crypto USB flash disk, which includes the following steps:

Step B1, activating the drive software, building a connection with the crypto USB flash disk;

Step B2, invoking, by the drive software, the dongle chip to generate a preset key and storing the preset key in the dongle chip;

Step B3, invoking, by the drive software, a first operating system function, popping up, by the operating system, a section information setting interface preset by the drive software;

Step B4, obtaining, by the drive software, section information from the section information setting interface;

Step B5, setting, by the drive software, a hidden area by dividing a memory chip, dividing the hidden area into a crypto area, a read-only area and a compact disk area according to the section information;

Step B6, invoking, by the drive software, the first operating system function, popping up, by the operating system, a crypto area password setting interface preset by the drive software;

Step B7, obtaining, by the drive software, a crypto area password from the crypto area password setting interface, generating a first hash value according to the crypto area password and the preset key;

Step B8, invoking, by the drive software, a second operating system function, adding a hidden area identification to a head of the hidden area, storing the section information and the first hash value to the head of the hidden area;

Step A101 specifically is: reading, by the drive software, the section information of the hidden area of the memory chip, creating a crypto area device object, a read-only area device object and a compact disk area device object according to the section information, creating a crypto area virtual drive letter according to the crypto area device object and binding the crypto area virtual drive letter, creating a read-only area virtual drive letter according to the read-only device object and binding the read-only area virtual drive letter, creating a compact disk area virtual drive letter according to the compact disk area device object and binding the compact disk area virtual drive letter, mapping the crypto area virtual drive letter, the read-only area virtual drive letter and the compact disk area virtual drive letter.

In Step A104, obtaining, by the drive software, a crypto area verification password from the interface for verifying crypto area password, determining whether the crypto area verification password is correct specifically is: determining, by the drive software, whether a crypto area verification password is correct according to the first hash value stored in the head of the hidden area.

In Embodiment 1, before Step B6 and Step B7 or after Step B6 and Step B7, the method further includes:

Step B6', invoking, by the software drive, a first operating system function popping, by the operating system, up a read-only area authorization setting interface preset by the drive software;

Step B7', obtaining, by the drive software, a read-only area authorization setting password from the read-only area authorization setting interface, generating a third hash value according to the read-only area authorization setting password and the preset key.

Step B8 specifically is: adding, by the drive software, a hidden area identification in the head of the hidden area, storing the section information, the first hash value and the third hash value in the head of the hidden area.

In Step A101, creating a read-only area virtual drive letter according to the read-only device object and binding the read-only area virtual drive letter specifically is: creating a read-only area virtual drive letter according to the read-only device object and binding the read-only area virtual drive letter and adding read-only attribution to the read-only area.

If the operation performed by an operating system on the device object is operation performed by the operating system on read-only area device object in Step A102, if the received instruction is write instruction, refusing operating in Step A106 can be substituted by: if the received instruction is write instruction, invoking, by the drive software, the first operating system function, popping up, by the operating system, a read-only area authorization setting password verifying interface, obtaining a read-only area authorization setting password from the read-only area authorization setting password verifying interface, reading the third hash value from the head of the hidden area, determines whether the read-only area authorization setting password is correct according to the third hash value, if yes, the drive software deletes the read-only attribution of the read-only area device object, invokes the memory chip to encrypt the data to be written to obtain the encrypted data to be written, maps write address of the read-only area of memory chip according to a second address in the writing instruction, writing the encrypted data to be written, if no, refusing operating.

In Embodiment 1, the method further includes a process for initializing the dongle chip by the drive software before Step B2, which includes the following steps:

Step B2'-1, invoking, by the drive software, the first operating system function, popping up, by the operating system, a customized seed code inputting interface preset by the drive software;

Step B2'-2, obtaining, by the drive software, a seed code from the customized seed code inputting interface, sending the seed code to the dongle chip; and Step B2'-3, performing, by the dongle chip, operation on the seed code to generate a product identification of the dongle chip and storing the product identification of the dongle chip, sending the product identification to the drive software.

Step B8 specifically is: adding, by the drive software, the hidden area identification to the head of the hidden area, storing the section information, the first hash value and the product identification in the head of the hidden area.

Before Step A101, the method further includes:
determining, by the drive software, whether the product identification of the head of the hidden area is identical to the product identification of the dongle chip, if yes, executing Step A101, if no, refusing operating.

In Embodiment 1, the section information specifically includes: sizes and starting locations of the crypto area, the read-only area, the compact disk area.

In Embodiment 1, the method further includes a process for initializing the data of the compact disk area by the drive software after Step B8, which includes the following steps:

Step A121, invoking, by the drive software, the first operating system function, popping up, by the operating system, a compact disk image file path inputting dialogue box preset by the drive software;

Step A122, obtaining, by the drive software, a compact disk image file path from the compact disk image file path inputting dialogue box, reading a compact disk image file according to the compact disk file path, sending the compact disk image file to the dongle chip;

Step A123, using, by the dongle chip, the preset key to encrypt the compact disk image file to obtain an encrypted compact disk file, sending the encrypted compact image file to the drive software; and Step A124, invoking, by the drive software, a second operating system to write the encrypted compact disk image file in the compact disk area of the hidden area of the memory chip.

Embodiment 2

Embodiment 2 provides an implementing method for a crypto USB flash disk. The crypto USB flash disk includes a crypto USB flash disk and a drive software, the crypto USB flash disk includes a memory chip and a dongle chip. The implement method for a crypto USB flash disk specifically includes a process for initializing the crypto USB flash disk and a process for using the crypto USB flash disk.

Figures 1, 2:
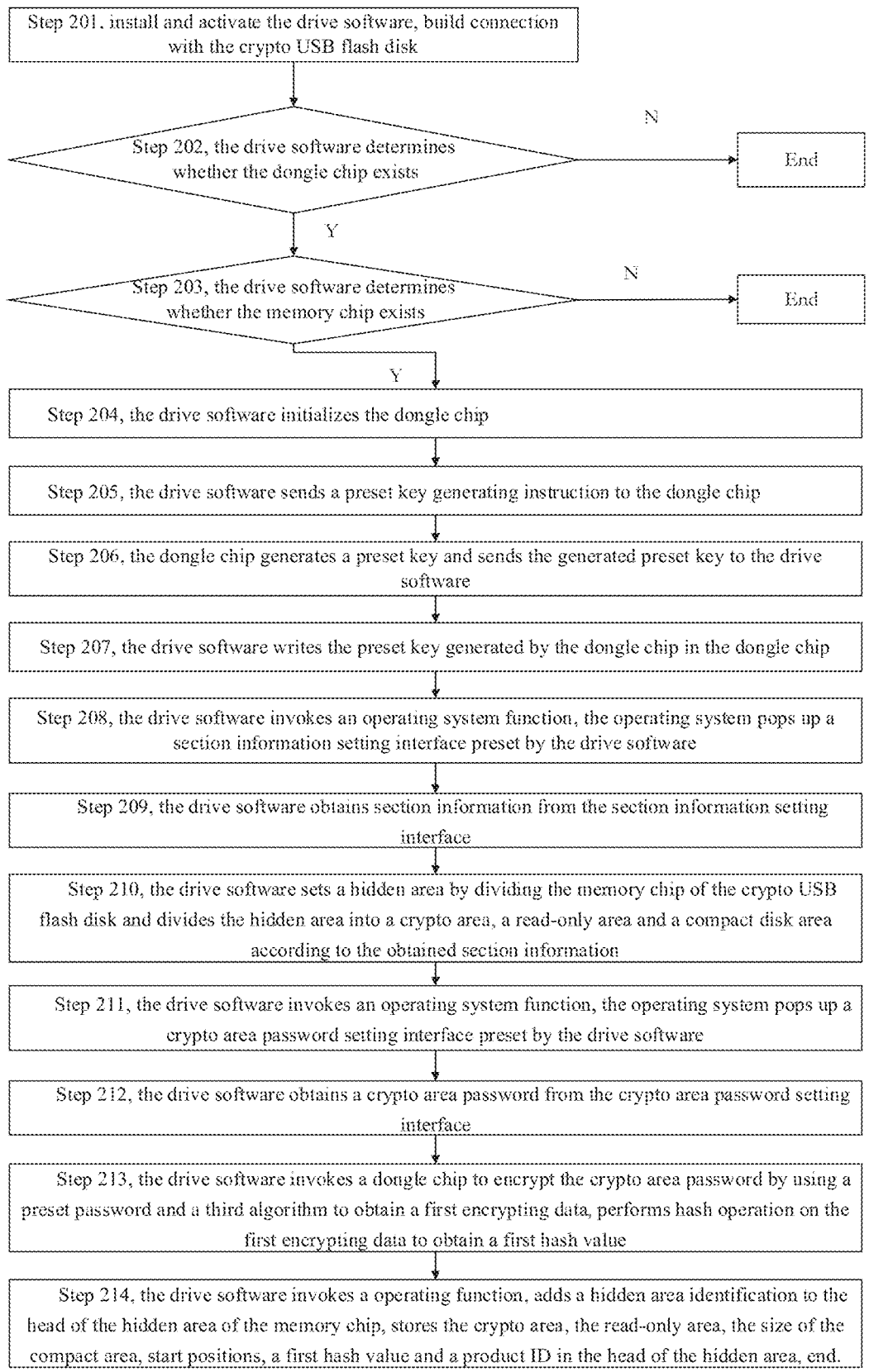
Figure 2:
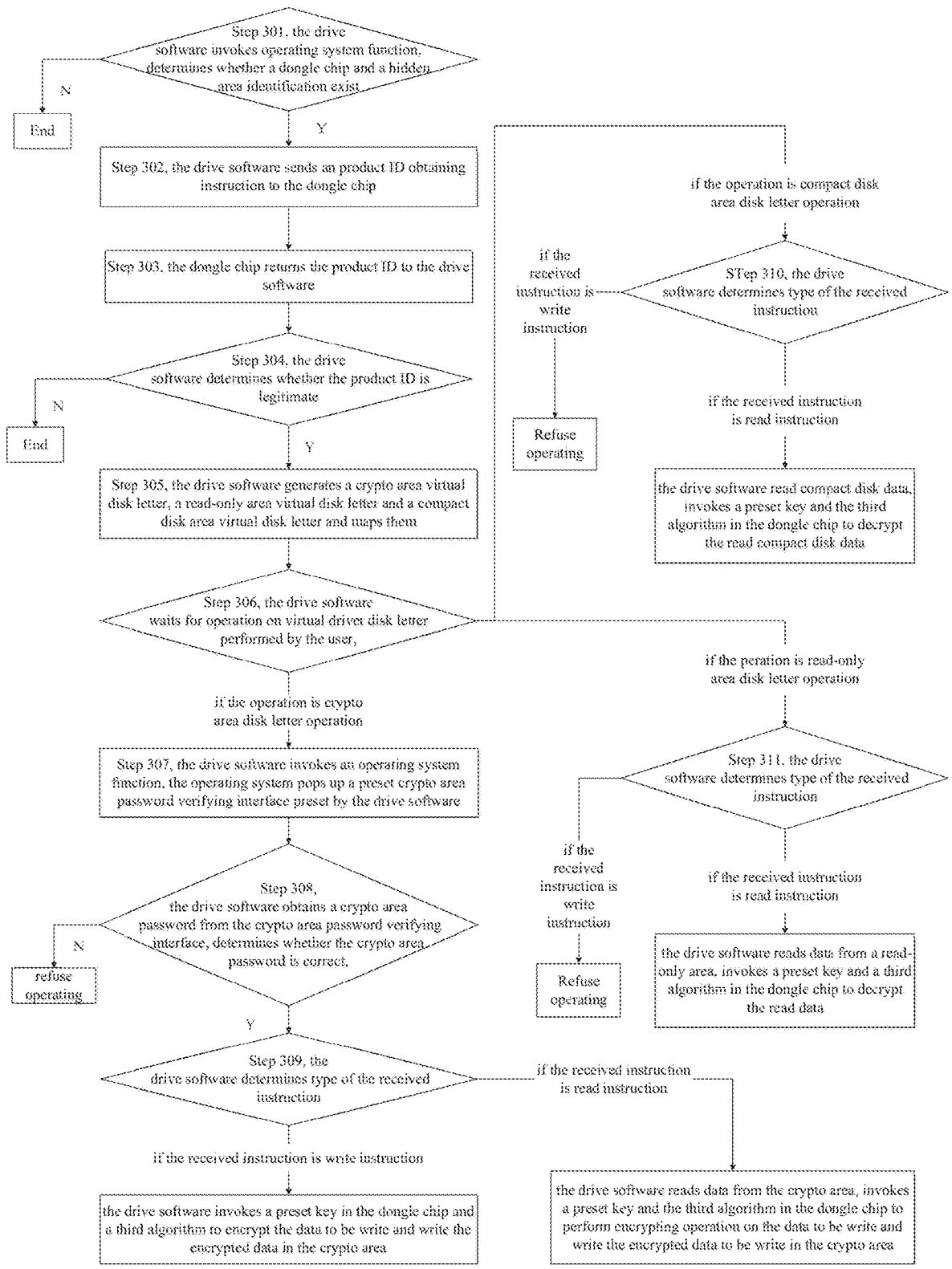

As shown in FIG. 2-1, the process for initializing the crypto USB flash disk includes the following steps:

Step 201, install and activate the drive software, build connection with the crypto USB flash disk; and Step 202, the drive software determines whether the dongle chip exists, if yes execute Step 203, if no, end the procedure.

Specifically, in Step 202, the drive software invokes SetupAPI serial function to traverse all USB devices in the system, obtains a vendor code number of the dongle chip and a product number of the dongle chip; determines whether the obtained vendor code number of the dongle chip and the product code of the dongle chip is identical to a vendor code number and a product code of the dongle chip which are pre-stored in a host computer, if yes, dongle chip exists, execute Step 203; otherwise, no dongle chip exists, end the procedure.

Specifically, after the Step, the method further includes: the drive software and the dongle chip perform key negotiating to obtain an agreed key.

Specifically, the drive software and the dongle chip perform key negotiating by using RSA algorithm to obtain an agreed key.

In Embodiment 2, in subsequent Steps of interacting between the dongle chip and the drive software, the agreed key can be used for encrypting and decrypting operation on the data transmitted between the dongle chip and the drive software.

Step 203, the drive software determines whether the memory chip exists, if yes, execute Step 204, if no, end the process or method.

Specifically, that the drive software determines whether memory chip exists specifically is:
that the drive software invokes Setup API serial function to obtain all disk storage devices connected with the operating system, then sends IOCTL_STORAGE-_QUERY_PROPERTY instructions to the devices by using DeviceIoControl function, obtains attribution of devices, taking the device with attribution of BusTypeUsb as plug-in memory chip.

Step 204, the drive software initializes the dongle chip.

Specifically, that the drive software initializes the dongle chip includes the following steps:

Step 204-1, the drive software logs on the dongle chip.

Step 204-1 is: the drive software generates a verifying logon password request according to a default dongle chip logon password, FFFFFFFFFFFFFFFF, sends the verifying logon password request to the dongle chip.

Specifically, the verifying logon password request is as follows:
00 20 01 00 00 00 10 00 46 46 46 46 46 46 46 46 46 46 46 46 46 46.

Preferably, in Step 204-1, the verifying logon password request can be sent after being encrypted by the agreed key.

Step 204-2, the dongle chip determines whether logon is permitted, if yes, execute Step 204-2, if no, send error information to the drive software, end the method.

Specifically, in Step 204-2, the dongle chip receives a verifying logon password request sent by the drive software, verifies the dongle chip logon password in the verifying logon password request, determines whether the dongle chip logon password is correct, if yes, send a response that the dongle chip logon password is correct to the drive software, execute Step 204-3, if no, send information of reporting error to the drive software.

Specifically, the dongle chip receives a verifying logon password request sent by the drive software, determines whether the dongle chip logon password in the verifying logon password request is identical to the dongle chip logon password stored in the dongle chip, if yes, send a response that the dongle chip logon password is correct to the drive software, i.e. 01 00 04 00 00 00 04 00 00 00 90, execute Step 204-3, if no, send information that the dongle chip logon password is error to the drive software, i.e. 01 00 02 00 00 00 02ff 68, end the method,
in which 90 is correct code representing that verifying is correct; ff 68 is error code representing that verifying is error.

Step 204-3, the drive software invokes a first function to make the operating system pop up a customized seed code inputting interface preset by the drive software.

Specifically, in Step 204-3, the drive software invokes DoModal function of CDialog class, the operating system pops up a customized seed code inputting interface preset by the drive software;

Step 204-4, the drive software obtains a customized seed code from the customized seed code inputting interface and sends the customized seed code to the dongle chip.

Specifically, the customized seed code is; 11 11 11 11 11 11 11 11 11 11 11 11 11 11 11 11.

Specifically, in Step 204-4, the drive software sends the customized seed code, which is sent by the operating system, to the dongle chip via following instruction: 00 15 00 00 00 00 10 0011 11 11 11 11 11 11 11 11 11 11 11 11 11 11, in which 11 11 11 11 11 11 11 11 11 11 11 11 11 11 11 is the seed cod with 16 bytes.

Step 204-5, the dongle chip receives the seed code and stores the seed code in the dongle chip, performs operation on the received seed code according to a first algorithm stored in the dongle chip to generate a product ID of the dongle chip, stores the product ID in the dongle chip and sends the product ID to the drive software, Specifically, Step 204-5 can be that the dongle chip performs operation on the seed code, i.e. 0x11 with 16 bytes, according to a first algorithm stored in the dongle chip to generate a production ID of the dongle chip, i.e. AD797F47, stores the product ID in the dongle chip and sends the product ID to the drive software by following instruction:

47 7f 79 ad 31 42 43 34 35 42 41 46 34 44 39 44 35 31 30 3137 f7 e5 59 14 00 00 90 00.

Step 205, the drive software sends a preset key generating instruction to the dongle chip.

Specifically, the drive software has stored parameters which is required when generating the preset key. In Step 205, the drive software sends a preset key generating instruction which includes the parameters used for generating preset key to the dongle chip.

Specifically, the preset key generating instruction sent by the drive software to the dongle chip is as follows: 00 48 00 00 00 00 06 00 46 54 44 49 53 4b.

In this case, the parameters required when generating the preset key is: 46 54 44 49 53 4b.

Step 206, the dongle chip generates a preset key and sends the generated preset key to the drive software.

Specifically, in Step 206, the dongle chip generates a preset key according to a second algorithm, a seed code and the received generated preset key and sends the generated preset key to the drive software.

Specifically, the dongle chip sends response data, i.e. 00 51 9a f0 16 40 7f 1a c7 e6 55 e1 e5 7f 67 48 10 00 00 90 00, to the drive software, in which the preset key is: 00 51 9a f0 16 40 7f 1a c7 e6 55 e1 e5 7f 67 48, a success code is: 90 00.

Step 207, the drive software writes the preset key generated by the dongle chip in the dongle chip.

Specifically, Step 207 includes the following steps:

Step 207-1, the drive software sends a key storing file creating instruction to the dongle chip.

In Step 207-1, the drive software sends a key storing file creating instruction to the dongle chip and sends a key storing file identification to the dongle chip.

Specifically, the drive software sends the following instruction to the dongle chip:

00 30 04 00 33 33 08 00 10.

in this case, the key storing file identification is: 0x3333.

Step 207-2, the dongle chip creates key storing file, sends a response that file storing file is created successfully to the drive software.

Specifically, in Step 207-2, the dongle chip creates key storing file according to the key storing file identification in the key storing file creating instruction and sends a response that the key storing file is created successfully to the drive software.

Specifically, in Step 207-2, the response that the key storing file is created successfully sent by the dongle chip to the drive software is: 0100 04 00 00 00 04 00 00 00 90, in which 90 is success code of successful creating.

Step 207-3, the drive software sends a preset key writing instruction to the dongle chip.

Specifically, the preset key writing instruction sent by the drive software to the dongle key is:
  00 32 04 00 33 33 16 00 00 00 00 00 10 00 00 51 9a f0 16 40 7f 1a c7 e6 55 e1 e5 7f 67 48,
  in this case, 0033 is identification of the key storing file in which the preset is written, 00 51 9a f0 16 40 7f 1a c7 e6 55 e1 e5 7f 67 48 is the preset key.

Step 207-4, the dongle chip writes the preset key in the key storing file and sends a response that the preset key is written successfully to the drive software.

Specifically, in this Step, the response that the preset key is written successfully is: 0100 04 00 00 00 04 00 00 00 90, in which 90 is success code that writing is successful.

Step 208, the drive software invokes an operating system function, the operating system pops up a section information setting interface preset by the drive software.

In Embodiment 2, Step 208 can be that the drive software invokes DoModal function of CDialog class of the operating system, the operating system pops up the section information interface preset by the drive software.

Specifically, the section information setting interface can includes an input box for inputting size of the crypto area, read-only area and compact disk.

In Embodiment 2, in Step 208, after popping up a user customized section information setting interface, the method further includes: the drive software formatting the crypto USB flash disk.

Step 209, the drive software obtains section information from the section information setting interface.

Step 210, the drive software sets a hidden area by dividing the memory chip of the crypto USB flash disk and divides the hidden area into a crypto area, a read-only area and a compact disk area according to the obtained section information.

Specifically, in Step 210, the drive software sets a hidden area by dividing the memory chip of the crypto USB flash disk, divides the hidden area into a crypto area, a read-only area and a compact disk area according to data input by the user in the customized section information setting up interface.

In Embodiment 2, Step 210 includes the following steps:

Step 210-1, the drive software calculates total size of the 3 sections, i.e. the crypto area, the read-only area and the compact disk area, in unit of MB according to sizes of the crypto area, the read-only area and the compact disk area in the section information.

Step 210-2, the drive software obtains number of sectors by converting according to the total size of the three areas and calculating formula, i.e. MB*1024*1024/512 and adds 1 sector occupied by a section table to obtain total size of the sectors of the hidden area.

Step 210-3, the drive software invokes ReadFile function to read the first 512 bytes of the memory chip, i.e, master boot record, finds a section information table stored at the location of 446 bytes from the master boot record and analyses the section information table.

Step 210-4, the drive software obtains a start cylinder head sector of sections from the second, the third and the fourth byte of the section information table, obtains an end cylinder head sector of sections from the sixth, seventh and eighth bytes, gets a number of total sectors of the memory chip, deducts number of sectors of the hidden area from a number of total sectors of a current section to obtain a number of sectors, takes the number of sectors as number of total sectors of a new section of the memory chip.

Preferably, in Step 210-4, deducting number of sectors of the hidden area from a number of total sectors of a current section and deducting 2048 sectors to obtain a number of sectors, the number of sectors as a number of total sectors of a new section of the memory chip.

Step 210-5, the drive software calculates an end logic sector of the new section, end head of the end logic sector, section and cylinder, write information of the end head, sector and cylinder on the sixth, seventh and eighth byte of the section information, writes number of the total sectors with four bytes on the thirteenth byte of the section information.

Step 211, the drive software invokes an operating system function, the operating system pops up a crypto area password setting interface preset by the drive software.

Specifically, in Step 211, the drive software invokes DoModal function of CDialog class of the operating system, the operating system pops up a crypto area password setting interface preset by the drive software.

Step 212, the drive software obtains a crypto area password from the crypto area password setting interface.

Specifically, in Embodiment 2, the crypto area password obtained by the drive software is: 123456.

Step 213, the drive software invokes a dongle chip to encrypt the crypto area password by using a preset password and a third algorithm to obtain a first encrypting data, performs harsh operation on the first encrypting data to obtain a first hash value.

Specifically, Step 213 can include:

Step 213-1, the drive software obtains the crypto password, i.e. 123456, sends a crypto area password encrypting instruction, i.e. 00 47 00 00 33 33 10 00 31 32 33 34 35 36, to the dongle chip, in the crypto area password encrypting instruction, 00 47 represents algorithm to be used; In Embodiment 2, the algorithm to be used is a third algorithm preset in the dongle chip, 33 33 represents identification of the key storing file in which the preset key to be used is, 31 32 33 34 35 36 is the crypto password;

Step 213-2, the dongle chip uses the preset key, which is stored in the key storing file with identification of 3333 specified in the crypto area password encrypting instruction, and the third algorithm preset in the dongle chip to encrypt the crypto area password to obtain a first encrypted data, i.e. 6c 76 71 cf 8f a8 c5 69 9d 5d 49 1c 37 35 72 e1 then returns the first encrypted to the drive software.

Step 213-3, the drive software receives the first encrypted data and send a hash operating instruction to the dongle chip.

Specifically, in Step 213-3, the drive software sends the hash operating instruction to the dongle chip.

Step 213-4, the dongle chip performs hash operation on the first encrypted data to obtain a first hash value.

Specifically, after the dongle chip receives the hash operating instruction, the dongle chip performs hash operation on the first encrypted data to obtain a first hash value, i.e. 4b 1c da 92 f8 eb dc 5d fb 42 1d 01 e1 e2 ab 97.

Step 213-5, the dongle chip returns a first hash value to the drive software.

Step 214, the drive software invokes an operating function, adds a hidden area identification to the head of the hidden area of the memory chip, stores the crypto area, the read-only area, the size of the compact area, start positions, a first hash value and a product ID in the head of the hidden area, ends the method.

In Embodiment 2, the present Step specifically is: the drive software invokes WriteFile function of the operating system, writs a customized section table in the first sector of the hidden area. The customized section table includes following contents:

The first byte to the fourth byte represent hidden area identification;

The fifth byte to the eighth byte represent product ID;

The ninth byte to the twelfth byte represent start position of the crypto area;

The thirteenth byte to the sixteenth byte represent size of the crypto area;

The seventeenth byte to the twentieth byte represent start position of the compact disk area;

The twenty-first byte to the twenty-fourth byte represent size of compact disk area;

The twenty-fifth byte to the twenty-eighth byte represent start position of the read-only area;

The twenty-ninth byte to the thirty-second byte represent size of the read-only area; and The thirty-third byte to the forty-eighth byte represents the first hash value.

In Embodiment 2, after Step 214, the method further includes: a process for initializing the compact disk data of the hidden area of the memory chip by the drive software.

That the drive software initializes the data of the compact disk of the crypto USB flash disk includes the following steps:

the drive software invokes DoModal function of CDialog class, the operating system pops up a compact disk image file path inputting dialogue box preset by the drive software; after the drive software obtains a compact disk image file path input by the user, the drive software reads a compact disk image file according to the compact disk image file path, sends the compact disk image file to the dongle chip; the dongle chip encrypts the compact disk image file by using a preset third algorithm and the preset key, sends the encrypted compact disk image file to the drive software; the drive software invokes WriteFile function of the operating system to write the encrypted compact disk image file in the compact area of the hidden area of the memory chip.

As shown in FIG. 2-2, the process for using the encrypted USB flash disk includes: after the drive software is set up and activated and connects to the crypt USB flash disk, the following steps are executed:

Step 301 the drive software invokes operating system function, determines whether a dongle chip and a hidden area identification exist, if yes, execute Step 303, if no, end the method.

Specifically, in Step 301 that the drive software invokes ReadFile function of the operating system and determines whether a dongle chip exists is identical to Step 202, no more detail is given here.

Process for determining whether a hidden area identification exits specifically is:

the drive software invokes ReadFile function of the operating system to read master boot record content in the first section of the memory chip, obtains section ending position of common USB flash disk at the position of the $452^{nd}$ byte, then obtains the sector position of the hidden area. The drive software invokes ReadFile file to read a first sector of the hidden area, determines whether the first four bytes of identification is identical to preset bytes, if yes, a hidden area identification exists: if no, no hidden area identification exists.

Step 302, the drive software sends a product ID obtaining instruction to the dongle chip.

Step 303, the dongle chip returns the product ID to the drive software.

Step 304, the drive software determines whether the product ID is legitimate, if yes, execute Step 305, if no, end the method.

Specifically, in the present Step 304, the drive software obtains a product ID in the head of the hidden area of the memory chip of the crypto USB flash disk, determines whether the product ID in the head of the hidden area is identical to the product ID obtained from the dongle chip, if yes, execute Step 305; if no, end the method.

Specifically, in Embodiment 2, the drive software reads a first sector in the hidden area of the memory chip of the crypto USB flash disk and obtains the fourth byte to the eighth byte of the first sector, i.e. product ID.

The drive software determines whether the product ID of the head of the hidden area is identical to the product ID obtained by the dongle chip, if yes, execute Step 305, if no, end the method.

Step 305, the drive software generates a crypto area virtual disk letter, a read-only area virtual disk letter and a compact disk area virtual disk letter and maps them.

Specifically, Step 305 includes the following steps:

Step A1, the drive software invokes Readfile function to read a first sector of the hidden area of the memory chip and reads section information.

Specifically, in Step A1, the drive software invokes Readfile function to obtain size of the crypto area, the read-only area and the compact area.

Step A2, the drive software creates device object of a preset device type according to the section information.

Specifically, in Step A2, the drive software invokes IoCreateDeviceSecure function of the operating system according to the size of the crypto area, the read-only area and the compact disk area and the sections of which size is non-zero, invokes the IoCreateDeviceSecure function of the operating system to create crypto area, read-only area and compact disk area according to the preset device types, creates device objects, i.e. crypto area device object, read-only area device object and compact disk area device object, sets up corresponding device object according to the size of the sections in the section information, preset device type attribution, such as compact drive attribution or read-only attribution.

Specifically, in Embodiment 2, when the drive software creates device object, setting up the corresponding device object attribution specifically is setting the attribution of the compact disk object as compact driver, setting the attribution of the crypto area device object as standard disk driver, setting the attribution of the read-only device object as standard disk driver and adding reading-only attribution as well.

Step A3, the drive software creates virtual disk letter according to device object and binds the virtual disk letter and the device object together.

Specifically, in Embodiment 2, the drive software invokes DefineDosDevice to create a virtual driver disk letter corresponding to the device object created in Step A2 and binds the device object and the corresponding virtual driver disk letter together.

Specifically, the drive software invokes the DefineDosDevice to create 3 virtual driver disk letters, i.e. crypto area virtual disk letter, compact disk area virtual disk letter and read-only area virtual disk letter. In this case, the crypto area virtual disk letter corresponds to the crypto area device object, the compact disk area virtual disk letter corresponds to the compact disk device object, the read-only area virtual disk letter corresponds to the read-only area device object.

In Step 305, after binding is completed, the operation on a virtual disk letter performed by the user will be sent to the corresponding to the device object, then in subsequent reading and writing operation performed on the memory chip, the device object will take operations such as open, read and write, etc. on its corresponding virtual driver disk letter, performs encrypting and decrypting operation by using the dongle chip when performing reading and writing operation.

Step 306, the drive software waits for operating on virtual driver disk letter performed by the user, if the operation is crypto area disk letter operation, executed Step 307; if the operation is compact disk area disk letter operation, execute Step 310; if the operation is read-only area disk letter operation, execute Step 311.

Step 307, the drive software invokes an operating system function, the operating system pops up a preset crypto area password verifying interface preset by the drive software.

Specifically, in Step 307, the drive software invokes DoModal function of CDialog class, the operating system pops up a preset crypto area password verifying interface preset by the drive software.

Step 308, the drive software obtains a crypto area password from the crypto area password verifying interface, determines whether the crypto area password is correct, if yes, execute Step 309, if no, refuse operating.

Specifically, in Step 308, after the drive software obtains a crypto area password input by the crypto area password verifying interface, reads a first hash value of the hidden area of the memory chip; the drive software encrypts the obtained crypto area password by using a third algorithm of the dongle chip to obtain a second encrypted data, performs hash operation on the second encryption data to obtain a second hash value, determines whether the second hash value is identical to the first hash value, if yes, the crypto area password input by the user is correct, execute Step 309, if no, refuse operation.

Step 309, the drive software determines type of the received instruction, if the received instruction is read instruction, the drive software reads data from the crypto area, invokes a preset key and the third algorithm in the dongle chip to perform encrypting operation on the data to be write and write the encrypted data to be write in the crypto area; if the received instruction is write instruction, the drive software invokes a preset key in the dongle chip and a third algorithm to encrypt the data to be write and write the encrypted data in the crypto area.

Specifically, in Step 309, if the received instruction is read instruction, the drive software obtains Parameters.Read.ByteOffset, which represents reading offset address, from Irp data structure of the read instruction of the operating system, obtains corresponding address of the data to be read in the memory chip by adding a crypto area start address stored in the hidden area and a read offset address to obtain an address corresponding to the data to be read in the memory chip, obtains length of data to be read represented by Parameters.Read.Length in Irp data structure in the read instruction of the operating system and reads data of the obtained length according to the corresponding address in the memory chip; the drive software invokes a preset key and a third algorithm in them dongle chip to perform decrypting operation on the read data in the crypto area, stores the decrypted data in a data buffer area, write the address stored in the data buffer of the decrypted data in the MdlAddress in the Irp data structure in the response of the read instruction, returns the response of read instruction to the operating system.

If the received instruction is a write instruction, the drive software obtains data length, which is represented by Parameters.Write.Length, from the Irp data structure of the write instruction of the operating system, obtains data to be write from MdlAddress, which represents data buffer, in the Irp data structure of the write instruction of the operating system; the drive software invokes the preset key and the third algorithm to perform encrypting operating on the data to be write, obtains write offset address represented by the parameters.Write.ByteOffset in Irp data structure of the write instruction of the operating system, obtains an address corresponding to the data to be write in the memory chip by adding the start address of the crypto area stored in the hidden area and the write offset address, write data of corresponding length in the corresponding address in the memory chip.

Step 310, the drive software determines type of the received instruction, if the received instruction is read instruction, the drive software read compact disk data, invokes a preset key and the third algorithm in the dongle chip to decrypt the read compact disk data; if the received instruction is write instruction, refuse operating.

Specifically, in Step 310, if the received instruction is a read instruction, the drive software obtains a read offset address represented by Parameters.Read.ByteOffset in the Irp data structure of the read instruction of operating system, obtains an address corresponding to the data to be read in the memory chip by adding a start address of the compact disk area stored in the hidden area and the read offset address, obtains length of data to be read from Parameter.Read-.Length in Irp data structure of the read instruction of the operating system, obtains data of the obtained length according to the corresponding address in the memory chip; the drive software invokes the preset key and the third algorithm in the dongle chip to decrypt the data read from the compact disk area, writes the stored address of the decrypted data in the data buffer in the MdlAddress in the Irp data structure in the response of the read instruction, returns the response of the read instruction to the operating system.

Step 311, the drive software determines type of the received instruction, if the received instruction is read instruction, the drive software reads data from a read-only area, invokes a preset key and a third algorithm in the dongle chip to decrypt the read data; if the received instruction is write instruction, refuse operating.

Specifically, in Step 311, if the received instruction is read instruction, the drive software obtains a read offset address represented by Parameters.Read.ByteOffset in Irp data structure of the read instruction of operating system, obtains address of the data to be read in the memory chip by adding a start address of the read only area stored in the hidden area and the read offset address, obtains length of the data to be read, which is represented by Parameters.Read.Length in Irp data structure of the read instruction of operating system, read the data of the length according to corresponding address in the memory chip; the drive software invokes the preset key and the third algorithm in the dongle chip to decrypt the data read from the compact disk area, stores the decrypted data in the data buffer, write a storing address of the decrypted data in the data buffer into the MdlAddress in Irp data structure in the response of the read instruction, returns the response of the read instruction to the operating system.

If the received instruction is a write instruction, the drive software writes STATUS_MEDIA_WRITE_PROTECTED error code, which represents refusing operation, in IoStatus.Status of Irp structure of the response of the write instruction and returns the response of the write instruction to the operating system.

Specifically, in Step 311, if the received instruction is write instruction, refusing operating can be replaced by: if the received instruction is write instruction, the drive software obtains device object of the read-only area, deleting the read-only attribution of the device object of the read-only area, invokes the preset key and the third algorithm in the dongle chip to encrypt the data to be written into the crypto area and write the encrypted data to the read-only area.

Specifically, in Embodiment 2, in the process for initializing the crypto USB flash disk, before Step A211 or after Step A214, the method further includes:

Step C1, The drive software invokes DoModal function of CDialog class of the operating system, the operating system pops up a read-only area authorization setting interface preset by the drive software;

Step C2, the drive software obtains a read-only authorization password input by the user from the read-only area authorization setting interface; and Step C3, the drive software invokes the dongle chip to encrypt the read-only authorization password by using the preset key and the third algorithm to obtain an encrypted third encrypted data, performs hash operation on the third encrypted data to obtain a third hash value, Step A214 specifically is: the drive software invokes WriteFile function of the operating system, add a hidden area identification to the head of the hidden area of the memory chip and stores the sizes, start positions of the crypto area, the read-only area and the compact disk area, the first hash value, the third hash value and the product ID in the head of the hidden area; ending.

In Step 311, if the drive software receives the write instruction, the drive software executes the following steps:

Step D1, The drive software invokes DoModal function of the CDialog class, the operating system pops up a read-only area authorization setting interface preset by the drive software.

Step D2, the drive software obtains a read-only area authorization password from the read-only area authorization setting interface, determines whether the obtained read-only area authorization password is correct, if yes, execute Step D3; if no, refuse operating.

Specifically, in Step D2, after the drive software obtains the read-only area authorization password from the read-only area authorization setting interface, the drive software reads a third hash value of the hidden area of the memory chip; the drive software uses the third algorithm of the dongle chip to encrypt the read-only area authorization password to obtain a fourth encrypted data, performs hash operation on the fourth encrypted data to obtain a fourth hash value, determines whether the fourth hash value is identical to the third hash value, if yes, the read-only area authorization password is correct, execute Step D3; if no, refuse operating.

Step D3, The drive software obtains device object of the read-only area, deletes the read-only attribution of the device object of the read-only area, invokes the preset key and the third algorithm in the dongle chip to encrypt the data to be written to the data of the crypto and write the encrypted data to the read-only area.

Embodiment 3

Figure 3:
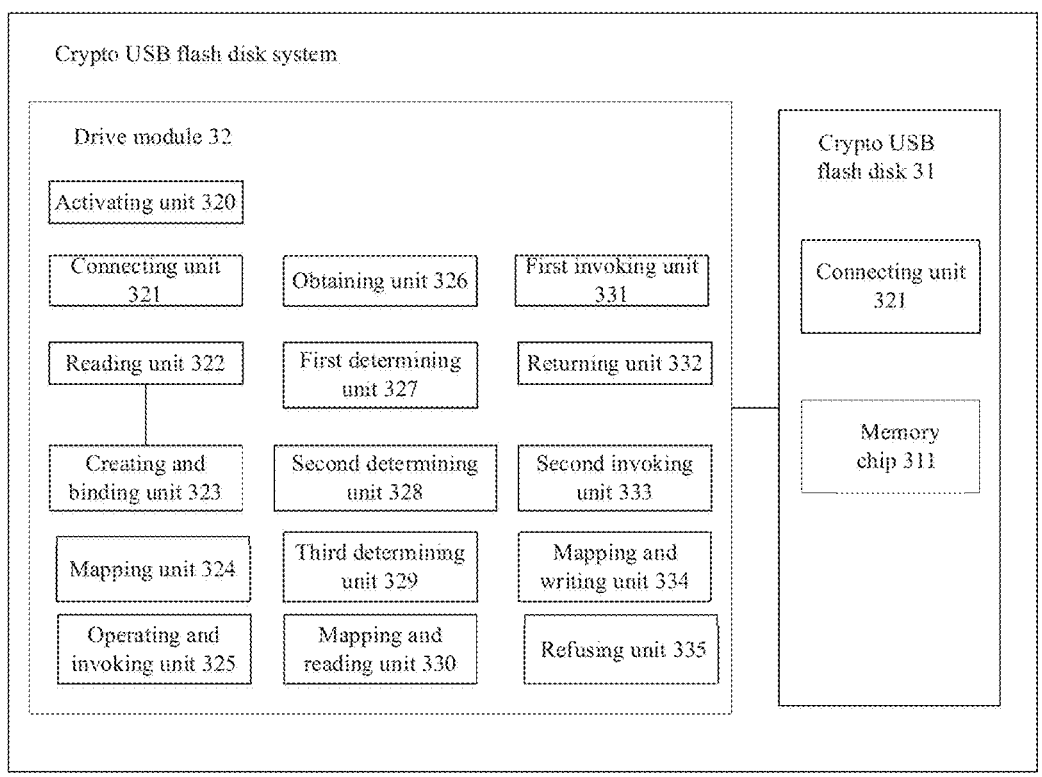
FIG. 3 is a structural diagram of a crypto USB flash disk system of the present Embodiment 3.

Embodiment 3 provides a crypto USB flash disk system. As shown in FIG. 3, the crypto USB flash disk system includes a crypto USB flash disk 31 and a drive module 32, the crypto USB flash disk 31 includes a memory chip 311 and a dongle chip 312.

The drive module 32 includes:

an activating unit 320 configured to activate the drive module 32;

a connecting unit 321 configured to build connection with the crypto USB flash disk;

a reading unit 322 configured to read section information of hidden area of the memory chip;

a creating and binding unit 323 configured to create a device object of preset device type according to the section information read by the reading unit 322, create a virtual drive letter according to the device object and bind the virtual drive letter and the device object together;

a mapping unit 324 configured to map the virtual drive letter after the creating and binding unit 323 binds the virtual drive letter and the device object together;

an operating and invoking unit 325 configured to wait for operation performed by an operating system on the device object; and configured to invoke a first operating system function and make the operating system pop up an interface for verifying crypto area password if the operation performed by an operating system on the device object is operation performed by the operating system on a crypto area device object;

an obtaining unit 326 configured to obtain a crypto area verification password from the interface for verifying crypto area password;

a first determining unit 327 configured to determine whether the crypto area verification password obtained by the obtaining unit 326 is correct;

a second determining unit 328 configured to determine type of a receive instruction when the first determining unit 327 determines that the crypto area verification password obtained by the obtaining unit 326 is correct;

a third determining unit 329 configured to determine type of a received instruction if the operation performed by an operating system on the device object is operation performed by the operating system on a compact disk area device object or read-only area device object;

a mapping and reading unit 330 configured to, when the second determining unit 328 determines that the received instruction is read instruction, map a read address in the memory chip according to a first address in the read instruction and read data; further configured to, when the third determining unit 329 determines that the received instruction is read instruction, map a read address in the memory chip according to a first address in the read instruction and read data;

a first invoking unit 331 configured to invoke the dongle chip 312 to decrypt the read data to obtain decrypted read data;

a returning unit 332 configured to return the decrypted read data obtained by the invoking unit to the operating system;

a second invoking unit 333 configured to invoke the dongle chip 312 to encrypt the data to be written to obtain encrypted data to be written;

a mapping and writing unit 334 configured to, when the second determining unit 328 determines that the received instruction is write instruction, map a write address in the memory chip according to a second address in the write instruction, write the encrypted data to be written;

a refusing unit 335 configured to, when the third determining unit 329 determines that the received instruction is write instruction, refuse operating, and the dongle chip 312 configured to decrypt the data read by the mapping and reading unit 330 to obtain the decrypted read data, further configured to encrypt the data to be written by the mapping and writing unit 334 to obtain encrypted data to be written.

In Embodiment 3, the drive module 32 further includes:

a fourth determining unit configured to determine whether a hidden area identification exists;

the reading unit 322 specifically is configured to, when the determining result of the fourth determining unit is yes, read section information of the hidden area of the memory chip; and the refusing unit 335 further configured to, when the determining result of the fourth determining unit is no, refuse operating.

In Embodiment 3, the drive module 32 further includes:

a first invoking and storing unit configured to invoke the dongle chip 312 to generate a preset key and store the preset key in the dongle chip 312;

a first invoking and popping unit configured to invoke a first operating system function to make the operating system pop up a section information setting interface preset by the drive software;

a dividing unit configured to divide the hidden area into a crypto area, a read-only area and a compact disk area according to the section information obtained by the obtaining unit 326;

a second invoking and popping unit configured to invoke the first operating system function and make the operating system to pop up a crypto area password setting interface preset by the drive software;

the obtaining unit 326 configured to obtain section information according to the section information setting interface; further configured to obtain a crypto area password from the crypto area password setting interface;

a generating unit configured to generate a first hash value according to the crypto area password and the preset key;

a second invoking and storing unit configured to invoke a second operating system function, add a hidden area identification to a head of the hidden area, store the section information and the first hash value to the head of the hidden area;

the creating and binding unit 323 specifically configured to create a crypto area device object, a read-only area device object and a compact disk area device object according to the section information, create a crypto area virtual drive letter according to the crypto area device object and bind the crypto area virtual drive letter, create a read-only area virtual drive letter according to the read-only device object and bind the read-only area virtual drive letter, create a compact disk area virtual drive letter according to the compact disk area device object and bind the compact disk area virtual drive letter;

the mapping unit 324 specifically is configured to map the crypto area virtual drive letter, the read-only area virtual drive letter and the compact disk area virtual drive letter; and the first determining unit 327 specifically is configured to determine whether the crypto area verification password is correct according to the first hash value stored in the head of the hidden area.

In Embodiment 3, the drive module 32 further includes:
a third invoking and popping unit configured to invoke a first operating system function, make the operating system pop up a read-only area authorization setting interface preset by the drive software;
the obtaining unit 326 further configured to obtain a read-only area authorization setting password from the read-only area authorization setting interface;
the generating unit further configured to generate a third hash value according to the read-only area authorization setting password and the preset key;
the second invoking and storing unit specifically configured to add a hidden area identification in the head of the hidden area, store the section information, the first hash value and the third hash value in the head of the hidden area;
the creating and binding unit 323 specifically configured to create a read-only area virtual drive letter according to the read-only device object and bind the read-only area virtual drive letter specifically is: the creating and binding unit specifically to create a read-only area virtual drive letter according to the read-only device object and bind the read-only area virtual drive letter and add read-only attribution to the read-only area;
when the third determining unit 329 determines that operating performed by the operating system on the device object is operation performed by the operating system on the compact disk device object, the refusing unit 335 is substituted by:
a fourth invoking and popping unit configured to invoke the first operating system function, make the operating system pop up a read-only area authorization setting password verifying interface;
the obtaining and reading unit 322 further configured to obtain a read-only area authorization setting password from the read-only area authorization setting password verifying interface, read the third hash value from the head of the hidden area;
a fifth determining unit configured to determine whether the read-only area authorization setting password is correct according to the third hash value;
a deleting unit configured to, when the determining result of the fifth determining unit is yes, delete the read-only attribution of the read-only area device object;
the mapping and writing unit 334 further configured to, when the second determining unit 328 determines that the received instruction is write instruction and after the deleting unit delete the read-only attribution of the read-only area device object, map write address of the memory chip according to a second address in the writing instruction, write the encrypted data to be written; and
the refusing unit 335 further configured to, when the determining result of the fifth determining unit is no, refuse operating.
In Embodiment 3, the drive module 32 further includes:
a fifth invoking and popping unit configured to invoke the first operating system function and make the operating system to pop up a customized seed code inputting interface preset by the drive software;
the obtaining unit 326 further configured to obtain a seed code from the customized seed code inputting interface and send the seed code to the dongle chip 312;
the second invoking and storing unit configured to add the hidden area identification to the head of the hidden area, store the section information, the first hash value and the product identification in the head of the hidden area;
a fifth determining unit configured to determine whether the product identification of the head of the hidden area is identical to the product identification of the dongle chip 312;
the reading unit 322 specifically configured to, when the determining result of the fifth determining unit is yes, read section information of hidden area of the memory chip;
the refusing unit 335 further configured to, when the determining result of the fifth determining unit is no, refuse operating, and
the dongle chip 321 further configured to perform operation on the seed code to generate a product identification of dongle chip 312 and store the product identification of dongle chip 312; further configured to send the product identification generated by the generating and storing unit to the drive module 32.
In Embodiment 3, the section information specifically includes; sizes and starting locations of the crypto area, the read-only area, and the compact disk area.
In Embodiment 3, the drive module 32 further includes;
a sixth invoking and popping unit configured to invoke the first the first operating system function and make the operating system pop up a compact disk image file path inputting dialogue box preset by the drive software;
the obtaining unit 326 further configured to obtain a compact disk image file path from the compact disk image file path inputting dialogue box;
a reading and sending unit configured to read a compact disk image file according to the compact disk file path and send the compact disk image file to the dongle chip 312;
an invoking and writing unit configured to invoke a second operating system function to write the encrypted compact disk image file in the compact disk area of the hidden area of the memory chip; and
the dongle chip 312 further configured to use the preset key to encrypt the compact disk image file to obtain an encrypted compact disk file and send the encrypted compact image file to the drive software.

Details of embodiments of the detecting method for anti-dismantling terminal and a device thereof are introduced by the present invention. The descriptions above are only specific embodiments of the present disclosure, but the protection scope of the present disclosure is not limited to this, and any changes or replacements that can be easily thought of within the technical scope disclosed by the present application by those skilled in the art shall fall within the protection scope of the present disclosure. Therefore, the scope of protection of the present invention shall be subject to the that defined by the appended claims.

The invention claimed is:
1. A method for realizing a system of a crypto USB flash disk, wherein the system of the crypto USB flash disk comprises a crypto USB flash disk and a drive software, the crypto USB flash disk comprises a memory chip and a dongle chip, the memory chip has a common memory area and a hidden area, the method comprises a process for using the crypto USB flash disk, before the process for using the crypto USB flash disk, the method further comprises a process for initializing the crypto USB flash disk, which comprises the following steps:

B1) activating the drive software, building the connection with the crypto USB flash disk;

B2) invoking, by the drive software, the dongle chip to generate a preset key and store the preset key in the dongle chip;

B3) invoking, by the drive software, a first operating system function, popping up, by the operating system, a section information setting interface preset by the drive software;

B4) obtaining, by the drive software, section information from the section information setting interface;

B5) setting, by the drive software, the hidden area by dividing the memory chip, dividing the hidden area into a crypto area, a read-only area and a compact disk area according to the section information;

B6) invoking, by the drive software, the first operating system function, popping up, by the operating system, a crypto area password setting interface preset by the drive software;

B7) obtaining, by the drive software, a crypto area password from the crypto area password setting interface, and generating a first hash value according to the crypto area password and the preset key;

B8) invoking, by the drive software, a second operating system function, adding a hidden area identification to a head of the hidden area, storing the section information and the first hash value to the head of the hidden area;

the process for using the crypto USB flash disk comprises the following steps:

A100) after activating the drive software, building a connection with the crypto USB flash disk;

performing key negotiating between the drive software and the dongle chip by using RSA algorithm to obtain an agreed key which can be used for encrypting and decrypting operation on data transmitted between the dongle chip and the drive software;

A101) reading, by the drive software, section information of the hidden area, creating a device object of a preset device type according to the section information, creating a virtual drive letter according to the device object, mapping the virtual drive letter after binding the virtual drive letter and the device object together;

A102) waiting for, by the drive software, operation performed by an operating system on the device object, if the operation performed by an operating system on the device object is operation performed by the operating system on a crypto area device object, executing Step A103, if the operation performed by an operating system on the device object is operation performed by the operating system on a compact disk area device object or a read-only area device object, executing Step A106;

A103) invoking, by the drive software, a first operating system function, in which the operating system pops up an interface for verifying a crypto area password;

A104) obtaining, by the drive software, a crypto area verification password from the interface for verifying the crypto area password, determining whether the crypto area verification password is correct, if yes, executing Step A105; if no, ending the process of the method;

A105) determining, by the drive software, a type of a received instruction;

if the received instruction is read instruction, mapping, by the drive software, a read address in the memory chip according to a first address in the read instruction; reading data from the memory chip; invoking the dongle chip to decrypt the read data so as to obtain decrypted read data; then returning the decrypted read data to the operating system; while if the received instruction is write instruction, invoking, by the drive software, the dongle chip to encrypt the data to be written to obtain encrypted data to be written; mapping a write address in the memory chip according to a second address in the write instruction; and writing the encrypted data to be written to the memory chip;

A106) determining, by the drive software, the type of the received instruction, if the received instruction is read instruction, mapping, by the drive software, a read address in the memory chip according to a first address in the read instruction, reading data, invoking the dongle chip to decrypt the read data, and returning the decrypted read data to the operating system; while if the received instruction is write instruction, refusing operating.

2. The method of claim 1, wherein before Step A101, the method further comprises:

determining, by the drive software, whether a hidden area identification exists, if yes, executing Step A101; if no, refusing operating.

3. The method of claim 1, wherein

Step A101 specifically is: reading, by the drive software, the section information of the hidden area of the memory chip, creating a crypto area device object, a read-only area device object and a compact disk area device object according to the section information, creating a crypto area virtual drive letter according to the crypto area device object and binding the crypto area virtual drive letter, creating a read-only area virtual drive letter according to the read-only device object and binding the read-only area virtual drive letter, creating a compact disk area virtual drive letter according to the compact disk area device object and binding the compact disk area virtual drive letter, and mapping the crypto area virtual drive letter, the read-only area virtual drive letter and the compact disk area virtual drive letter; and in Step A104, obtaining, by the drive software, a crypto area verification password from the interface for verifying the crypto area password, and determining whether the crypto area verification password is correct specifically is: determining, by the drive software, whether a crypto area verification password is correct according to the first hash value stored in the head of the hidden area.

4. The method of claim 1, wherein before Step B6 and Step B7 or after Step B6 and Step B7, the method further comprises:

Step B6') invoking, by the software drive, a first operating system function, popping up, by the operating system, a read-only area authorization setting interface preset by the drive software; and Step B7') obtaining, by the drive software, a read-only area authorization setting password from the read-only area authorization setting interface, generating a third hash value according to the read-only area authorization setting password and the preset key;

Step B8 specifically is: adding, by the drive software, a hidden area identification in the head of the hidden area, and storing the section information, the first hash value and the third hash value in the head of the hidden area;

in Step A101, creating a read-only area virtual drive letter according to the read-only device object and binding the read-only area virtual drive letter specifically is: creating a read-only area virtual drive letter according to the read-only device object and binding the read-only area virtual drive letter and adding read-only attribution to the read-only area;

if the operation performed by the operating system on the device object is operation performed by the operating system on read-only area device object in Step A102, if the received instruction is the write instruction, refusing operating in Step A106 can be substituted by: if the received instruction is the write instruction, invoking, by the drive software, the first operating system function, popping up, by the operating system, a read-only area authorization setting password verifying interface, obtaining a read-only area authorization setting password from the read-only area authorization setting password verifying interface, reading the third hash value from the head of the hidden area, determining whether the read-only area authorization setting password is correct according to the third hash value, if yes, deleting, by the drive software, the read-only attribution of the read-only area device object, invoking the memory chip to encrypt the data to be written to obtain the encrypted data to be written, mapping the write address of the read-only area of memory chip according to a second address in the writing instruction, and writing the encrypted data to be written, if no, refusing operating.

5. The method of claim 1, wherein the method further comprises a process for initializing the dongle chip by the drive software before Step B2, which comprises the following steps:

Step B2'-1) invoking, by the drive software, the first operating system function, popping up, by the operating system, a customized seed code inputting interface preset by the drive software;

Step B2'-2) obtaining, by the drive software, a seed code from the customized seed code inputting interface, and sending the seed code to the dongle chip; and Step B2'-3) performing, by the dongle chip, operation on the seed code to generate a product identification of the dongle chip, storing the product identification of the dongle chip, and sending the product identification to the drive software;

Step B8 specifically is: adding, by the drive software, the hidden area identification to the head of the hidden area, and storing the section information, the first hash value and the product identification in the head of the hidden area;

before Step A101, the method further comprises:

determining, by the drive software, whether the product identification of the head of the hidden area is identical to the product identification of the dongle chip, if yes, executing Step A101, if no, refusing operating.

6. The method of claim 1, wherein the section information specifically comprises: sizes and starting locations of the crypto area, the read-only area, and the compact disk area.

7. The method of claim 1, wherein the method further comprises a process for initializing the data of the compact disk area by the drive software after Step B8, which comprises the following steps:

A121) invoking, by the drive software, the first operating system function, popping up, by the operating system, a compact disk image file path inputting dialogue box preset by the drive software;

A122) obtaining, by the drive software, the compact disk image file path from the compact disk image file path inputting dialogue box, reading the compact disk image file according to the compact disk image file path, and sending the compact disk image file to the dongle chip;

A123) using, by the dongle chip, the preset key to encrypt the compact disk image file to obtain an encrypted compact disk file, and sending the encrypted compact image file to the drive software; and A124) invoking, by the drive software, a second operating system to write the encrypted compact disk image file in the compact disk area of the hidden area of the memory chip.

* * * * *